(12) United States Patent
Wood et al.

(10) Patent No.: US 9,071,634 B2
(45) Date of Patent: Jun. 30, 2015

(54) NETWORK MANAGEMENT SYSTEM, SOFTWARE AND METHOD

(75) Inventors: Anderson J. Wood, Loveland, OH (US); Robert E. Daniel, Miamisburg, OH (US); Tina M. Stafford, Kettering, OH (US)

(73) Assignee: NCR Corporation, Duluth, GA (US)

( * ) Notice: Subject to any disclaimer, the term of this patent is extended or adjusted under 35 U.S.C. 154(b) by 858 days.

(21) Appl. No.: 12/609,459

(22) Filed: Oct. 30, 2009

(65) Prior Publication Data

US 2011/0106860 A1 May 5, 2011

(51) Int. Cl.
G06F 15/173 (2006.01)
H04L 29/08 (2006.01)
H04L 12/24 (2006.01)

(52) U.S. Cl.
CPC ............ *H04L 67/125* (2013.01); *H04L 41/085* (2013.01); *H04L 41/12* (2013.01); *H04L 67/303* (2013.01)

(58) Field of Classification Search
USPC .................................. 709/224, 220, 221, 223
See application file for complete search history.

(56) References Cited

U.S. PATENT DOCUMENTS

| 7,698,561 B2* | 4/2010 | Nagendra et al. ............. 713/181 |
| 2004/0172412 A1* | 9/2004 | Files et al. .................. 707/104.1 |
| 2006/0123428 A1* | 6/2006 | Burns .......................... 719/318 |
| 2007/0156877 A1* | 7/2007 | Krishnan et al. ............. 709/223 |
| 2009/0058631 A1* | 3/2009 | Wall et al. .................... 340/517 |
| 2010/0030875 A1* | 2/2010 | Visser et al. .................. 709/220 |
| 2010/0082632 A1* | 4/2010 | Kumar .......................... 707/741 |
| 2010/0266131 A1* | 10/2010 | Cilfone et al. ................. 380/285 |
| 2010/0293266 A1* | 11/2010 | Schilling et al. .............. 709/224 |
| 2010/0306305 A1* | 12/2010 | DeHaan ......................... 709/203 |
| 2011/0167145 A1* | 7/2011 | Bush et al. .................... 709/223 |
| 2013/0167196 A1* | 6/2013 | Spencer et al. .................. 726/3 |

* cited by examiner

*Primary Examiner* — Lan-Dai T Truong
(74) *Attorney, Agent, or Firm* — Joseph P. Mehrle

(57) ABSTRACT

A fault prediction system comprises a processor, a data storage device and a network connection. The processor acts to commence monitoring of a newly notified device upon the network irrespective of whether details of the device are stored in a database on the data storage device or not.

2 Claims, 3 Drawing Sheets

NETWORK MANAGEMENT SYSTEM, SOFTWARE AND METHOD

FIELD OF THE INVENTION

The present invention relates to a network management system, network management software and a method of network management. More particularly, but not exclusively, the invention relates to a network management system, network management software and a method of network management that discovers and monitors a device added to a distributed network of self-service devices, or in a component of said at least one self-service device.

BACKGROUND TO THE INVENTION

Typically, in a network of managed devices, such as automated teller machines (ATMs), agents collect performance metric data relating to the operation of components of the managed devices and send alert messages when a device malfunctions. In the case of ATMs typical components that are managed include a card reader, a receipt printer, a cash dispenser, a journal printer, a display, a keypad, and a deposit module comprising either, or both, of a check deposit unit and a cash deposit unit. In the case of a network of ATMs, each ATM runs agents, for example SNMP agents that monitor a number of performance metrics associated with the operation of the ATM including, inter alia, the status of components of the ATM.

The ATM transmits the data across a communications network to a network management system (NMS), such as Gasper Vantage, available from N.C.R. Corporation of Dayton, Ohio. The NMS runs applications that manage and control the managed devices. Currently, when a new device is added to the network the new device is not monitored until the device owner has added additional details to the NMS database. This requires the device owner to scour an exception log that that identifies messages received from a network host when the device detailed in the message is not detailed in the NMS system.

SUMMARY OF THE INVENTION

According to a first aspect of the present invention there is provided a network management system arranged to manage a network of managed devices, the system comprising a processor and a data storage device, the processor being arranged to receive device identification data from a managed device, the data storage device being arranged to store device identification data associated with at least one other managed device in a database, the processor being arranged to compare the received device identification data to the device identification data in the database to determine whether the managed device is known to the system, adding the device to a database of managed devices on the data storage device if the managed device is not known to the system, and importing device characteristics from a pre-defined template into the database based upon the device identification data, the processor being arranged to monitor some or all performance data associated with the managed device based upon the imported device characteristics.

Such a system notifies the device owner that a new device has been added to the system and monitors the device prior to the owner providing full device details. This results in the period between the addition of the device to the system and the owner providing full device details, when there is no monitoring of the device, being removed. This further results in a reduced likelihood of a fault condition going undetected over current systems.

The processor may be arranged to receive device data providing details of the managed device. The device data may be transmitted by the device owner, typically in the form of a template. The details may comprise at least one of the following: a list of peripheral devices to be monitored, parameters associated with each peripheral device, geographical location, hardware information about the device. The processor may be arranged to update the database stored on the data storage device with the details contained in the device data.

The processor may be arranged to monitor a core set of parameters of the managed device prior to receiving the device data.

The processor may be arranged to assign a pre-defined status code associated with the addition of the managed device to the database which is displayed in an event log associated with the network management system. Alternatively, or additionally, the processor may be arranged to generate a notification to an owner of the managed device that the device has been added to the database of managed devices The managed device may comprise a self-service terminal. The managed device may comprise any of the following: an automated teller machine (ATM), an information kiosk, an electronic funds transfer (EFT) terminal a financial services centre, a bill payment kiosk, a video, DVD, multi-media, mpeg3 etc sales/rental kiosk, a lottery kiosk, a postal services machine, a check-in and/or check-out terminal such as those used in the retail, hotel, car rental, gaming, healthcare, and airline industries, or the like.

According to a second aspect of the present invention there is provided a computer implemented method of managing a network of devices comprising the steps of:
i) receiving device identification data from a managed device at a processor;
ii) storing device identification data associated with at least one other managed device in a database at a data storage device;
iii) comparing the received device identification data to the device identification data in the database;
iv) determining whether the managed device is known to the system;
v) adding the device to a database of managed devices on the data storage device if the determination of step (iv) is negative;
vi) importing device characteristics from a pre-defined template into the database based upon the device identification data; and
vii) monitoring of some or all performance data associated with the managed device by the processor based upon the imported device characteristics.

The method may comprise receiving device data providing details of the managed device at the processor. The device data may be transmitted by the device owner, typically in the form of a template. The details may comprise at least one of the following: a list of peripheral devices to be monitored, parameters associated with each peripheral device, geographical location. The method may comprise updating of the database stored on the data storage device with the details contained in the device data by the processor.

The method may comprise monitoring a core set of parameters of the managed device prior to receiving the device data.

The method may comprise assigning a pre-defined status code associated with the addition of the managed device to the database which is displayed in an event log associated with the network management system. Alternatively, or additionally, the method may comprise generating a notification to an owner of the managed device that the device has been added to the database of managed devices. The method may comprise transmitting the notification to the device owner.

The managed device may comprise a self-service terminal. The managed device may comprise any of the following: an automated teller machine (ATM), an information kiosk, an electronic funds transfer (EFT) terminal a financial services centre, a bill payment kiosk, a video, DVD, multi-media, mpeg3 etc sales/rental kiosk, a lottery kiosk, a postal services machine, a check-in and/or check-out terminal such as those used in the retail, hotel, car rental, gaming, healthcare, and airline industries, or the like.

According to a third aspect of the present invention there is provided software which when executed upon a processor causes the processor to operate as the processor of the first aspect of the present invention.

According to a fourth aspect of the present invention there is provided software which when executed upon a processor causes the processor to execute the method of the second aspect of the present invention.

According to fifth aspect of the present invention there is provided a method of reducing downtime of a managed device in a managed network comprising scheduling maintenance of the network comprising adding devices to the network according to the second aspect of the present invention.

As all device in the network are managed from their entry on to the network downtime associated with unmonitored device is eliminated.

According to an sixth aspect of the present invention there is provided a method of increasing earnings associated with transactions carried out at a managed device comprising reducing the downtime of the managed device according to the eighth aspect of the present invention.

BRIEF DESCRIPTION OF THE DRAWINGS

Embodiments of the present invention will now be described, by way of example only, with reference to the accompanying drawings, in which.

DETAILED DESCRIPTION

Figure 1:
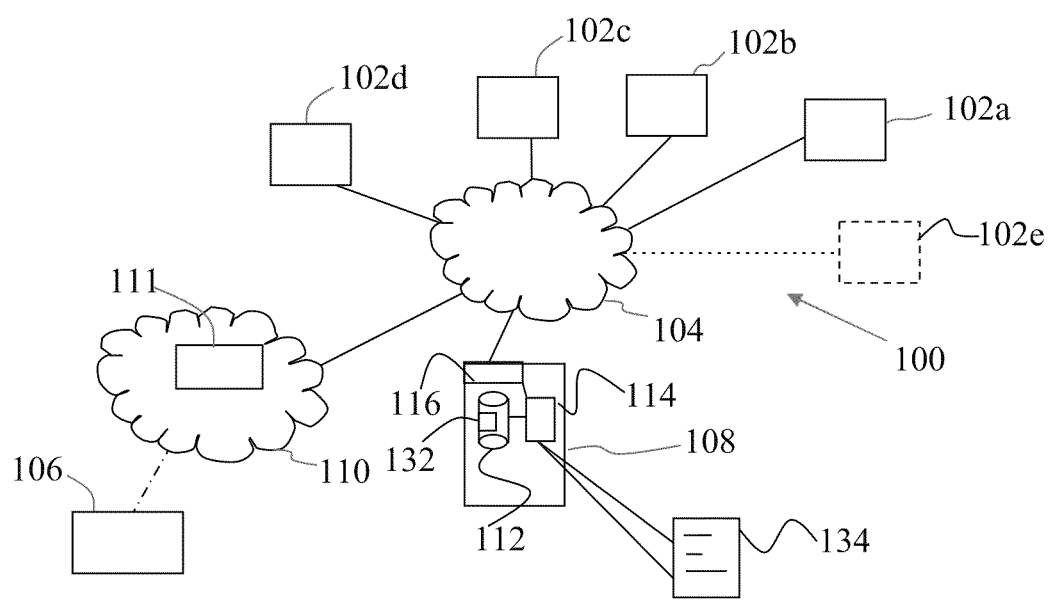
FIG. 1 is a schematic diagram of an embodiment of managed network comprising a network management system according to an aspect of the present invention.
Figure 2:
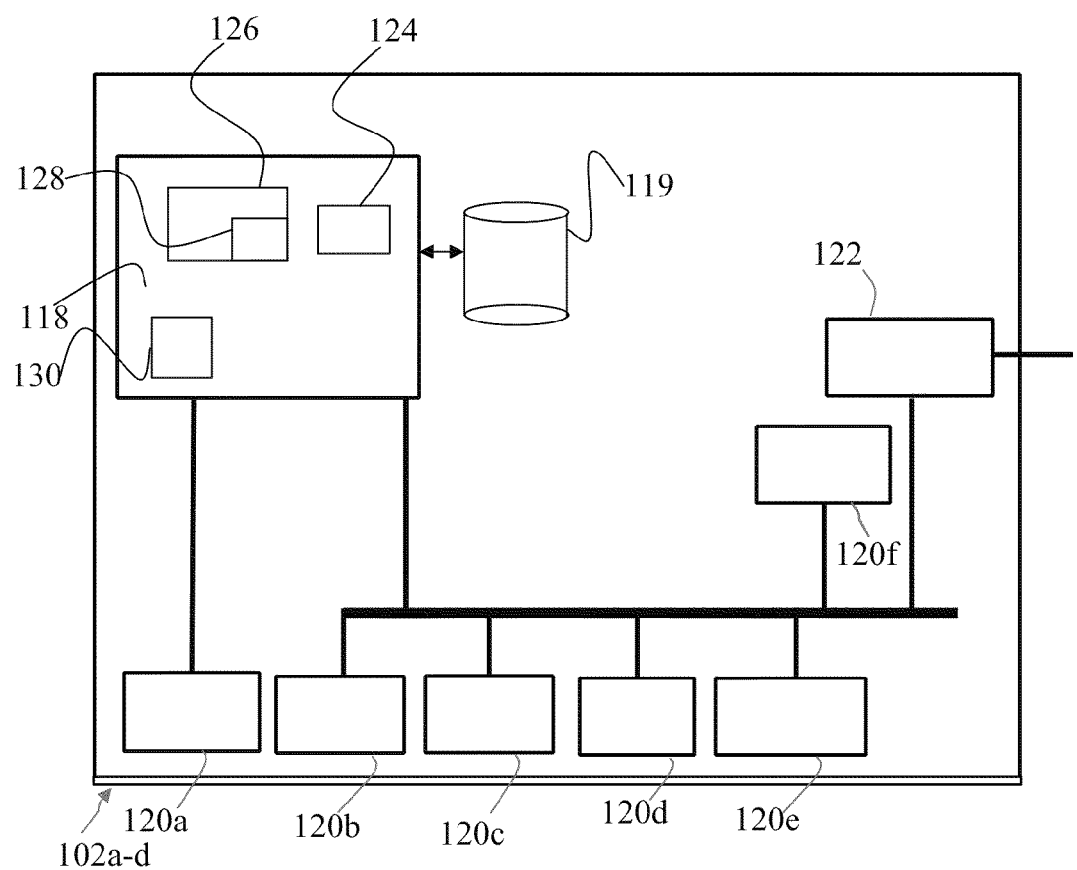
FIG. 2 is a schematic diagram of an ATM of the network of FIG. 1.

Referring now to FIGS. 1 and 2, a managed network 100 of ATMs comprises ATMs 102a-d, a communications network 104, an authorization host 106, a management unit 108 and an interchange network 110.

The communications network 104 comprises a secure network over which transactions data for transactions executed at the ATMs 102a-d passes to the authorization host 106. Typically, the communications network 104 is a private network or a VPN.

The authorization host 106 authorizes "on us" transactions (that is, where the financial institution operating the ATM network 100 is also the issuer of a card used by the customer), and can route "not on us" transactions to authorization hosts of other financial institutions via the interchange network 110.

The management unit 108 comprises a data storage device 112, a processor 114 and a network connection 116.

Typically, each ATM 102 a-d comprises a controller 118, a local data storage device 119, a number of peripheral devices 120 a-f, and a network connection 122. Normally, the data storage device 119 is a magnetic disc and may form part of the controller in some embodiments.

The controller 118 is typically a PC core running the Microsoft® Windows XP® system and comprises a BIOS 124 stored in non-volatile memory, a microprocessor 126 and associated main memory 128.

Typical peripheral devices found in the ATMs 102a-d comprise, but are not limited to, a card reader device 120a, a receipt printer 120b, a display 120c with associated function display keys (FDKs) 120d, an encrypting keypad 120e, and a cash dispenser device 120f.

In the present embodiment an SNMP management agent 130 resides at the controller 118. However, it will be appreciated that in another embodiment respective management agents may reside at each of the peripheral devices 120a-f.

The management agent 130 collects status and performance data about the operation of the peripheral devices 120a-f of the ATMs 102a-d. For example, the management agent 130 may receive a status message indicating that the cash dispenser 120f is low on banknotes. As another example, the management agent 130 may receive an error message indicating that there is a paper jam in the receipt printer 120b of an ATM 102a-d. In a third example, the management agent 130 may receive an error message indicating that there is a failure in a critical component, such as a cash dispenser device 120f.

The data storage device 112 stores, inter alia, a database 132 which contains the details of each of the ATMs 102a-d monitored by the management unit 108, and historical performance data for each of the monitored ATMs 102a-d.

In one embodiment, upon the addition of a new ATM 102e to the network 100 the new ATM 102e announces its presence by transmitting device identification data across the communications network 104 to the management unit 108.

In another embodiment, the management unit 108 polls the managed devices, ATMs 102a-d, across the communications network 104 to determine which devices are present on the network 100. Upon discovering a new ATM 102e upon the network 100 the management unit's processor 114 requests identification data from the new ATM 102e across the communications network 104. The new ATM 102e transmits identification data to the management unit 108.

In both embodiments described above the identification will typically include some or all of the following non-limiting examples, the make of ATM, a network identification number, the model of ATM, the ATM owner, the serial number of the ATM.

In response to receiving the identification data from the new ATM 102e, the processor 114 accesses the database 132 stored upon the data storage device 112 which contains details of all ATMs 102a-d that are already known and compares a relevant portion of the identification data to the entries in the database 132 in order to determine if the ATM 102e is new to the network, or whether it is rejoining the network following, for example, a shutdown for maintenance.

If details of the ATM 102e exist within the database 132 then the management unit 108 proceeds to monitor the operation of the ATM 102e in accordance with a previously generated parameter file stored on the data storage device 112.

If the details of the ATM 102e are not found within the database 132 the processor 114 recovers template data containing details of parameters of the ATM 102e that are to be monitored from the data storage device 112. The management unit 108 then monitors the operation of the new ATM 102e based upon the contents of the template data. Typically, the template data is previously generated by the owner of the new ATM 102e and stored on the data storage device 112, such that all relevant operating parameters of the ATM 102e are monitored from the outset. Alternatively, the data storage device 112 holds one or more generic template data sets which described basic operating parameters of the ATM 102e that are to be monitored. For example, each manufacturer of ATMs may provide a generic base sets of parameters to monitor across their range of ATMs. Alternatively, individual models of ATM may be characterized in individual template data sets.

The status of the ATMs 102a-e and their peripheral devices are classified by status codes defined in software running on the management unit 108. These status codes are stored into a referenced table. The status codes describe events that can occur at the ATMs 102a-e, for example a jammed card reader, lost communications link, out of service, etc. These status codes are formed into a status table which has "1 to many" applicability. The status code table is then assigned to the template object used in the automatic registration of the ATM 102e. Thus, in creating the status table and status codes, then assigning to the template object, the user defines how to monitor the core set of parameters of the ATM 102e.

Preferentially, an owner specified template data set is used, as this will define all parameters that the owner wishes to monitor. However, if this is not available a model specific template data set would provide a less owner specific, yet still tailored set of parameters to be monitored. A model specific template data set can be applied where the identification data transmitted by the ATM 102e includes appropriate data for identifying the model. Similarly, a manufacturer specific template data set would only be applicable for use where the manufacturer of the ATM 102e can be identified from the identification data received by the processor 108. Another option is to use a non-model, non-manufacturer template data set, i.e. truly generic, in order to monitor only basic functionality of the ATM 102e, if the identification data does not contain sufficient information to allow any of the other possible template data structures to be applied.

In some embodiments, the processor 114 generates a notification comprising the identity of the new ATM 102e, as determined from the identification data, and forwards this notification to the ATM's owner via the network connection 116 and the communications network 104. The ATM owner is again determined from the identification data. Typically, this notification comprises an invitation for the ATM's owner to update the template data that determines the parameters monitored by the management unit 108. In response to this invitation the ATM owner can either fill in and forward additional template data to the management unit 108 to update the template data stored on the data storage device 112 via a form, typically a web based form, or can access the management unit 108 directly to update the template data stored on the data storage device 112. Alternatively, or additionally, the processor 114 outputs an event to an event log 134 under a predetermined event code, such that the event is readily identified as the addition of a new device to the network 100. For example if most event codes are in the range 0 to 999, the addition of a new ATM 102e to the network 100 can have an event code of 5555, thus readily distinguishing it from other events on the network 100. The presence of this code in the event log 134 acts as a prompt to the ATMs owner to update the template data held on the data storage device 112 as noted above, if necessary.

Figure 3:
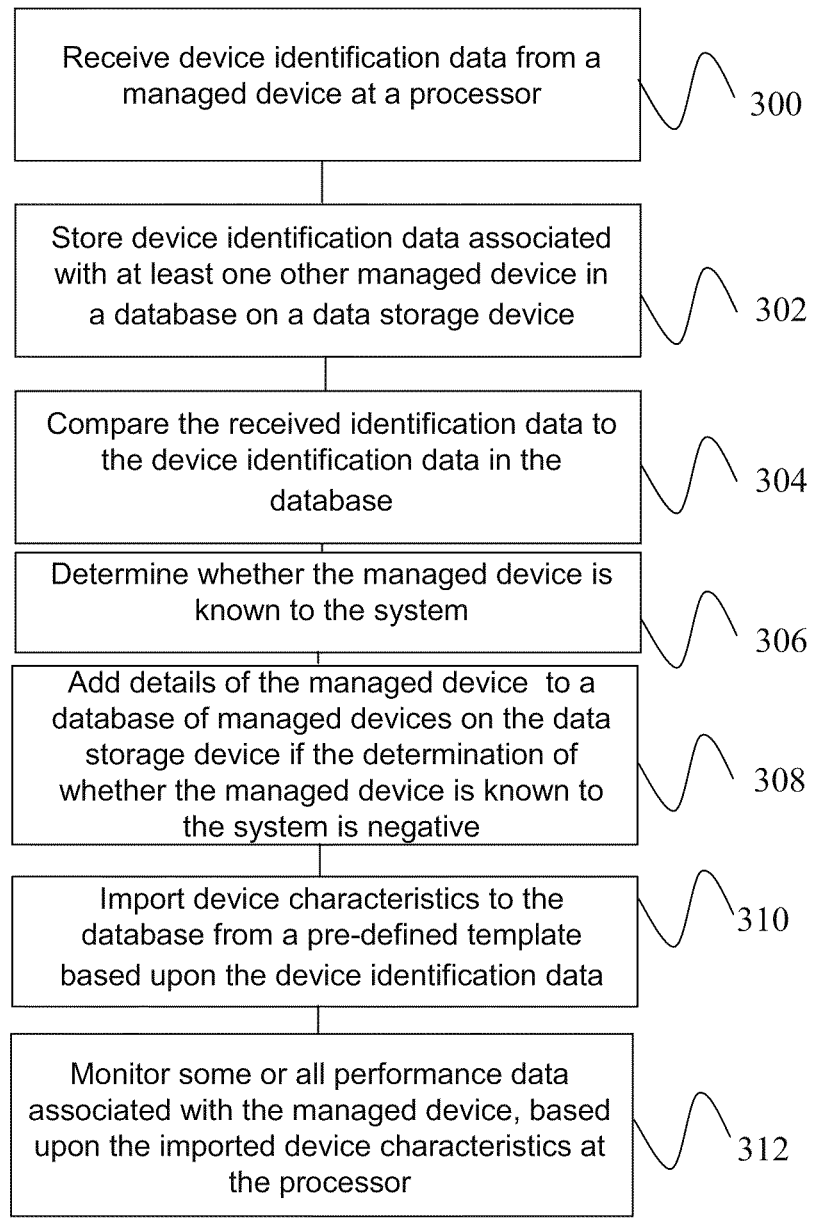
FIG. 3 is flow chart showing the steps of a computer implemented method of managing a network of devices according to another aspect of the present invention.

Referring now to FIG. 3, a computer implemented method of managing a network of devices comprises a processor receiving device identification data from a managed device (Step 300). A database on a data storage device stores device identification data associated with at least one other managed device (Step 302). The received device identification data is compared to the device identification data in the database (Step 304) to determine whether the managed device is known to the system (Step 306). The managed device is added to a database of managed devices on the data storage device if the determination of whether the managed device is known to the system is negative (Step 308). The database imports device characteristics from a pre-defined template based upon the device identification data (Step 310)

The processor monitors some or all performance data associated with the managed device, based upon the imported device characteristics (Step 312).

It will be appreciated that, although the present invention is described with reference to a network of ATMs, the term "managed device" as used herein encompasses the following, non-limiting, examples of devices: an automated teller machine (ATM), an information kiosk, an electronic funds transfer (EFT) terminal a financial services centre, a bill payment kiosk, a video, DVD, multi-media, mpeg3 etc sales/rental kiosk, a lottery kiosk, a postal services machine, a check-in and/or check-out terminal such as those used in the retail, hotel, car rental, gaming, healthcare, and airline industries, or the like.

It will be further appreciated that although described herein with reference to a network comprised exclusively of ATMs the present invention is equally applicable to mixed networks comprising differing types of managed devices. For example point of sales (POS) terminals, ATMs and information kiosks can be managed by a single management unit.

It will also be appreciated that the steps of the methods described herein may be carried out in any suitable order, or simultaneously where appropriate. The methods described herein may be performed by software in machine readable form on a tangible storage medium or as a propagating signal.

As described herein the managed device comprises one or more peripheral devices each of which is operable to perform at least one specific function. Typically, the peripheral device implements its function either in response to a customer action and/or a command received from a PC core (which is also a peripheral device) of the device. Non-limiting examples of peripheral devices include: display, card reader, journal printer, rear operator panel, encrypting keypad, PC core, cash dispenser etc.

Typically, each peripheral device comprises a processor to enable the peripheral device to perform its function, and a communications facility to enable the peripheral device to communicate with the controller, but in some instances this may not be essential.

Each peripheral device comprises one or more components that contribute to the execution of the peripheral device's respective function. Typically, each component comprises a replaceable part within the module. Non-limiting examples of components include: for the display module, a display panel, a display panel housing, and the like; for a cash dispense module, a note thickness sensor, a pick unit, a presenter unit, and the like.

Each component comprises one or more parts configured to enable the device to contribute to the execution of the peripheral device's function. Non-limiting examples of parts include: for a motorized card reader module, a width switch, a shutter, a pre-read magnetic head, a magnetic stripe reading head, and the like.

Various modifications may be made to the above described embodiments without departing from the spirit and the scope of the invention.

The invention claimed is:

1. A computer implemented method of managing a network of devices comprising the steps of:
   (i) electronically by a processor, receiving pre-defined template data containing a first set of device characteristics;
   (ii) electronically by a processor, storing the pre-defined template data containing the first set of device characteristics in a data storage unit;
   (iii) electronically by a processor, receiving device identification data from a device to be monitored and managed;
   (iv) electronically by a processor, comparing the received device identification data to device identification data stored in a database of the data storage unit;
   (v) electronically by a processor, determining whether the device is known to the system based upon the comparison of step (iv);
   (vi) electronically by a processor, adding the device identification data of the device to the database if the determination of step (v) is negative;
   (vii) electronically by a processor, obtaining the first set of device characteristics from the pre-defined template data of the database if the determination of step (v) is negative, wherein the template data includes a list of peripheral devices to be monitored, parameters associated with each peripheral device, geographical location, hardware information about the device;
   (viii) electronically by a processor, monitoring at least some performance data associated with the device based upon the first set of device characteristics imported from the pre-defined template data into the database; and
   (ix) electronically by a processor, continuing to monitor the device based upon the first set of device characteristics until a second set of device characteristics which is different from the first set of device characteristics is received and stored in the data storage unit at a later time.

2. The method of claim 1, wherein the second set of device characteristics comprises full device details for the device, and the first set of device characteristics comprises only basic device details sufficient to allow the device to be monitored and managed until the full device details are received and stored in the data storage unit at the later time.

\* \* \* \* \*